United States Patent [19]

Boyce, II

[11] 4,047,390

[45] Sept. 13, 1977

[54] SEA TENT

[76] Inventor: William D. Boyce, II, 1 Boulevard de la Gare 95760, Valmondois, France

[21] Appl. No.: 498,925

[22] Filed: Aug. 20, 1974

[51] Int. Cl.² ............................................. B63C 11/00
[52] U.S. Cl. ..................................... 61/69 R; 61/1 R; 61/1 F; 61/101; 52/2
[58] Field of Search ....................... 61/69, 46.5, 1, 1 F, 61/46, 30, 29; 114/.5 T, 44, 50, 54; 52/2

[56] References Cited

U.S. PATENT DOCUMENTS

| | | | |
|---|---|---|---|
| 3,373,568 | 3/1968 | Hornbostel, Jr. | 61/30 X |
| 3,389,559 | 6/1968 | Logan | 61/1 F |
| 3,429,128 | 2/1969 | Stafford et al. | 61/46.5 |
| 3,610,194 | 10/1971 | Siegel | 61/1 F |
| 3,653,215 | 4/1972 | Crucet | 61/1 F |
| 3,664,136 | 5/1972 | Laval, Jr. | 61/69 R |
| 3,710,582 | 1/1973 | Hills et al. | 114/.5 T X |
| 3,786,638 | 1/1974 | Fish | 61/30 |
| 3,851,487 | 12/1974 | Lambertsen | 61/69 R |

FOREIGN PATENT DOCUMENTS 1,541,188  8/1968  France .......................... 61/5

Primary Examiner—Jacob Shapiro
Attorney, Agent, or Firm—Fleit & Jacobson

[57] ABSTRACT

Apparatus for isolating from a body of water a predetermined bottom area and a volume of water or other liquid extending above the bottom area up to the surface of the body of water, comprising a flexible wall member with a flexible and conforming base section formed on its lowermost edge. The base section is adapted to be filled selectively from the surface of the body of water to anchor the wall member to the bottom. A float member is secured to the uppermost section of the wall member to keep the wall member floating above the surface of the body of water.

16 Claims, 15 Drawing Figures

SEA TENT

The present invention is a substitute application of U.S. pat. application Ser. No. 41,779 filed June 5, 1970 and now abandoned.

BACKGROUND OF THE INVENTION

The invention generally relates to a portable container having an adjustable endless wall which can be positioned in a body of water so as to isolate a selected bottom area together with the volume of water above the bottom area from the adjacent water.

One of the major problems of underwater work in the fields of underwater research, engineering, construction, salvage, oil development, amusements, experimentation, ostreiculture, marine biology, archeology, and in other fields has been the lack of visibility due to floating debris, mud, sand, sediment, plankton, or other particles in the water. Another major problem results from movement of the water, causing the work area or the object of interest to be covered with shifting mud, muck, sand, and debris. Such material movement naturally occurs due to tides, currents, surface storms or other causes either natural or man-made. In a natural state these water movement factors may be so constant that work is either impossible or inconvenient to perform and/or start. Even when these water movement factors are intermittent, and preparatory clean-up has been started and/or completed and temporarily abandoned, a shifting of the bottom may cover the work area or object with additional mud, muck, sludge, waste material or sand. Where men and equipment are working on the bottom area, other problems are present such as working against a current flow and inclement temperature differential such as prohibitive cold.

My invention includes provision of means to permit clarification of water of low visibility in a given underwater area, to facilitate the functioning of men and/or equipment for work or pleasure and to protect the working area, even if abandoned, from the aforementioned effects of moving water. The present invention was developed to overcome the aforementioned problems and present a solution to these problems.

DESCRIPTION OF KNOWN ART

Many attempts have been made to isolate men and machinery working on the water bottom from the surrounding water. In the early 1800's as shown by U.S. Pat No. 5,834, a long tube secured by guide lines and anchored to the bottom encompassed a diver's upper body to protect it from the surrounding water. The tube extended upward to the surface to provide the diver with air so that the diver could work for periods of time on the ocean bottom. Another attempt to allow men to work on the bottom of water area is shown by U.S. Pat. No. 1,016,808 in which a collapsible and flexible caisson made of a plurality of sections is supported by a float on its upper end and is secured at its lower end to an observation chamber seated on the sea floor. Mining or examination of the sea floor was accomplished by placing one's arm into a sleeve positioned on the side of the observation chamber to gather material from the sea floor. A similar device was shown in U.S. Pat. No. 1,017,486. Other submersible structures are shown in U.S. Pats. Nos. 3,289,415, 3,435,793 and 3,548,605 which disclose devices for transporting, storing and containing materials in isolation from surrounding water.

SUMMARY OF INVENTION

The present invention utilizes a submersible container comprising a flexible closed wall member which defines the lateral limits of a column of water isolated from a larger body of water. At the lowermost end of the flexible wall, a base member is secured to the wall member. The base member is preferably constructed in the form of a continuous tube formed from flexible material which when filled with a heavy fill material, conforms to the topography of the floor of the body of water. Fill tubes are provided along the wall member for filling the base member from the surface of the body of water. Along the top of the flexible wall member, one or more float members are secured which, by virtue of their buoyancy, support the flexible wall member in an upright position.

BRIEF DESCRIPTION OF THE DRAWINGS

The invention including various alternate embodiments are illustrated by the accompanying drawings in which.

DETAILED DESCRIPTION OF THE DRAWINGS

As shown by the drawings the container comprises an adjustable wall structure isolating from a large body of water an area of water extending upwardly from the bottom to the surface.

Figure 5:
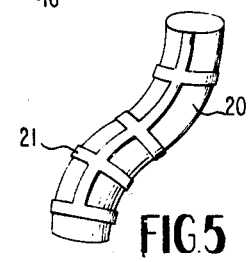
FIG. 5 is an enlarged perspective view of a reinforcing member which can be used with the container apparatus.

In one form of the inventive sea container, the portable submersible container comprises a closed flexible wall member 1 having a tubular configuration which defines the lateral and vertical limits of an area of water isolated from a larger body of water. The wall member is formed of a flexible impervious material such as neoprene, nylon, reinforced plastic, rubber or other suitable material so that it can be collapsed and transported to a particular location. However, strengthening ribs (as shown in FIG. 5) can be provided on the material rendering it semi-rigid or rigid. secured to the lowermost portion of the flexible wall member 1 is a base member 2 normally comprising a circular hollow endless tube bounding the selected water bottom area. It is also contemplated that base member 2 can include more than one circular endless tube, since more than one might be desirable to effect the desired seal when the sea floor is uneven or rocky.

The hollow base member 2 is adapted to receive and contain a filling material 4, such as sand, gravel, junk, metal filings, pellets, material pumped from the water bottom or heavy liquid as for example a high saline water solution. The hollow base member 2 communicates with passage means for carrying the fill material 4 to the hollow base member 2. The passage means takes the form of a plurality of fill tubes 3 communicating at their lower ends with the interior of the hollow base member 2, and with their upper ends reaching above the water surface or to the edge of float 7 in a position to receive the fill material carried from water borne vessels or pumped from shore or vessel.

Figure 1:
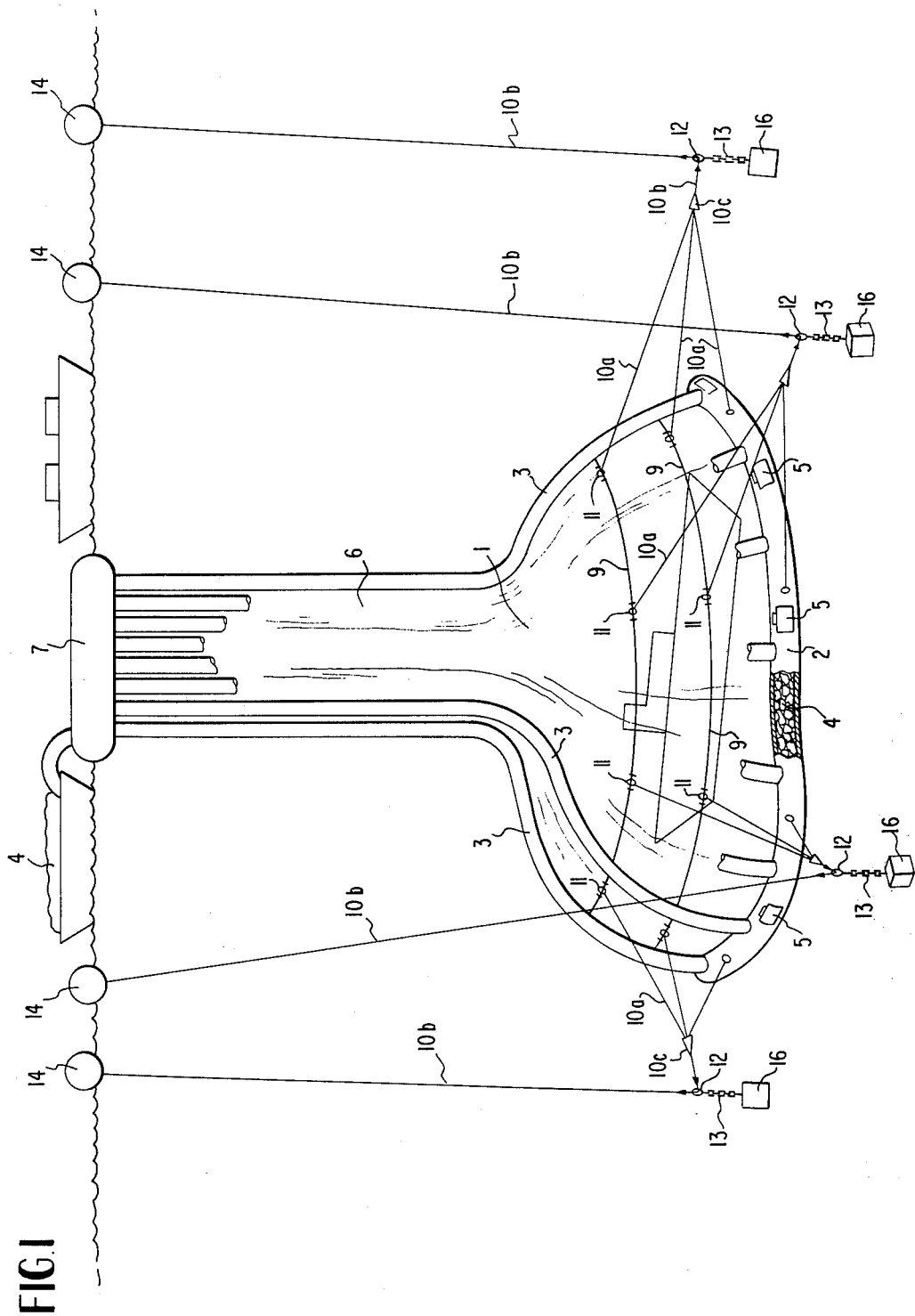
FIG. 1 is a side elevation view of one form of the container apparatus partly in section with means for securing it in desired position on a selected bottom surface of a body of water.
Figure 2:
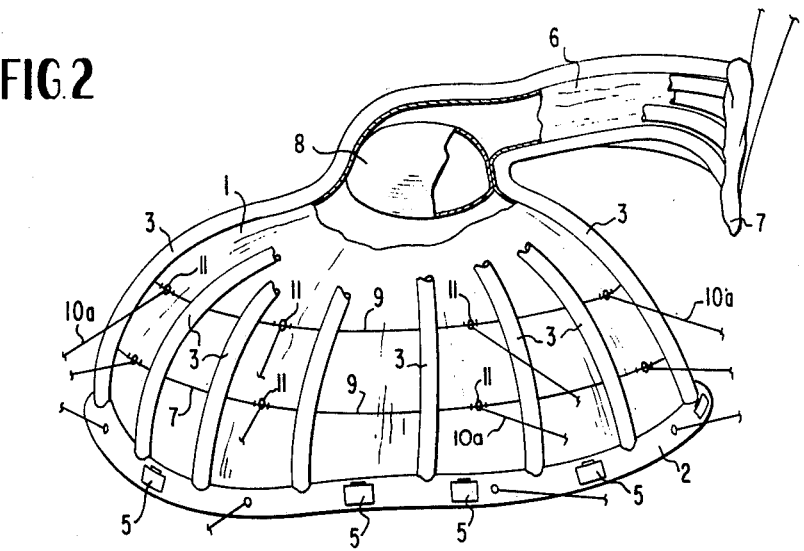
FIG. 2 is a side elevation view of the container of FIG. 1, partly in section, in a position to be left temporarily abandoned during surface storms or for other reasons.
Figure 12:
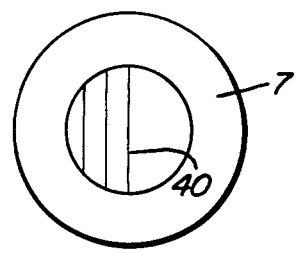
FIG. 12 is a plan view of the surface section of the invention of FIG. 1 with flexible flooring.

The fill tubes 3 preferably are flexible as shown in FIGS. 1 and 2 but may be made of rigid material if desired. Fill tubes 3 may be detachable from wall member 1 for removal after base member 2 is filled. Fill evacuation hatches 5 are mounted to the hollow base member 2 to cover evacuation apertures formed in the base member and are provided with selectively controlled closure means controlled by cable, chain, or other suitable means (not shown). Resting on the top surface of the volume of water and secured to the top of wall member 1 is a float section 7 comprising a circular inflatable tube member. If desired, the float section may include a platform such as the one shown in FIG. 12. The platform is preferably provided with flooring 40 to hold equipment such as motors, pumps, generators, cranes, winches and other suitable machines. Alternately, float section 7 may take the form of a rigid floatable body or a series of linked bodies. In this regard, it is contemplated that when the float section 7 includes a platform or takes a rigid form, such as a barge or the like, section 7 could also serve as a habitat or have decompression chambers for divers, etc.

As shown in FIGS. 1 and 2, the upper portion of the flexible member 1 of the sea container compises a narrowed section 1a which in some respects resembles a chimney and a wider canopy section 1b. This construction is contrasted with the construction shown in FIG. 3 in which the flexible wall member 1 extends substantially vertically with a uniform diameter. In both of these embodiments the upper section or chimney of the wall member 1 is utilized as a means of access or egress to or from the interior of the container. The upper section is of sufficient size to permit the passage of men, material and equipment necessary for the work contemplated to be done within the sea container.

As shown in FIG. 2, a balloon valve 8 is wedged in the interior of the container at the junction 1c of the lower wider section 1b and the upper narrower section 1a. The balloon valve member 8 comprises a sphere of flexible material which may be filled with a fluid such as water, air, gasoline, oil, etc. or a combination of fluids.

Figure 3:
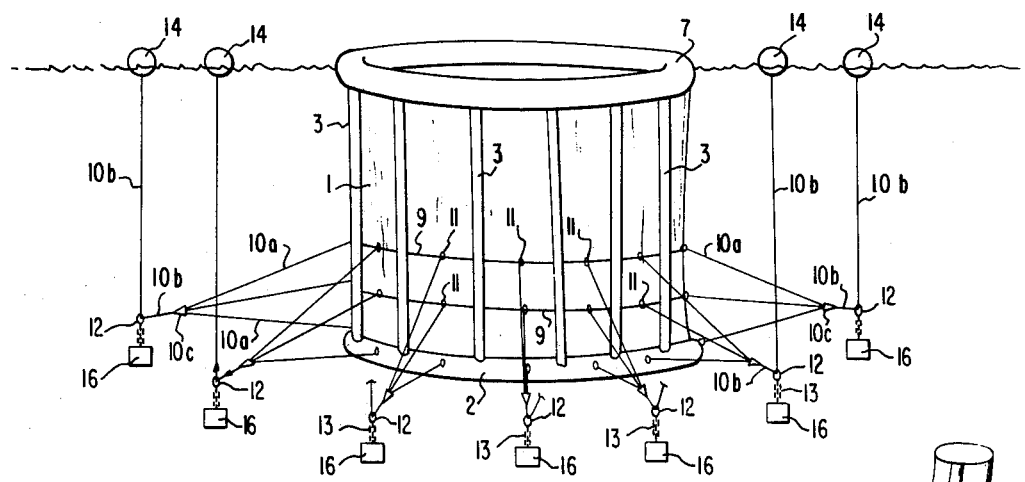
FIG. 3 is a side elevation view of another embodiment of the container having a substantially constant diameter from the bottom to the top.
Figure 4:
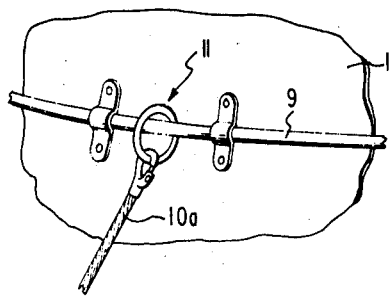
FIG. 4 is an enlarged view of the connection of one of the securing lines shown in the FIGS. 1-3.
Figure 6:
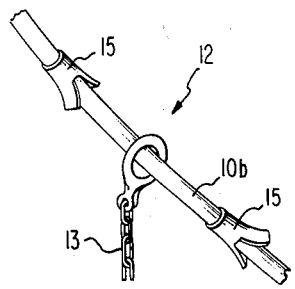
FIG. 6 is an enlarged perspective view of the connection of one of the securing lines to an anchor showing a one-way spring detent construction.

The submersible sea container is retained in a selected position relative to the selected water bottom area by means which will now be described. Rigging lines 9 are disposed about the circumference of the lower section 1b of the flexible wall member 1 and secured to the flexible wall member by adhesives, stitching, brackets, clamps or other suitable means. Attached to the rigging lines 9 and the base 2 are slidable securing lines 10a arranged, for example, in groups of three lines each. The rigging and securing lines 9 and 10a respectively are shown in FIGS. 1–3 and are connected together by a connecting member 11. The connecting member 11, as shown in FIG. 4, comprises a ring slidably mounted around a rigging line 9 and a releasable hook secured to one end of the securing line 10a. Each group of securing lines 10a is detachably secured to a disconnectable connecting member 10c. The connecting member 10c is secured to one end of a terminal securing line 10b. Line 10b is shown in enlarged form in FIG. 6 and is movably connected to an anchor 16 by means of an anchor connection 12. The other end of the line 10b is secured to a float 14. The anchor connection 12 comprises a ring member 12a connected by chain 13 to an anchor 16. Mounted on the line 10b on either side of the anchor connection ring member 12a are one-way spring detents 15 which enable the line 10b to pass in one direction through the ring member 12a while presenting return of the line through the ring member. This arrangement of the spring detents facilitates the tightness of the lines between the ring and the container.

Figure 7:
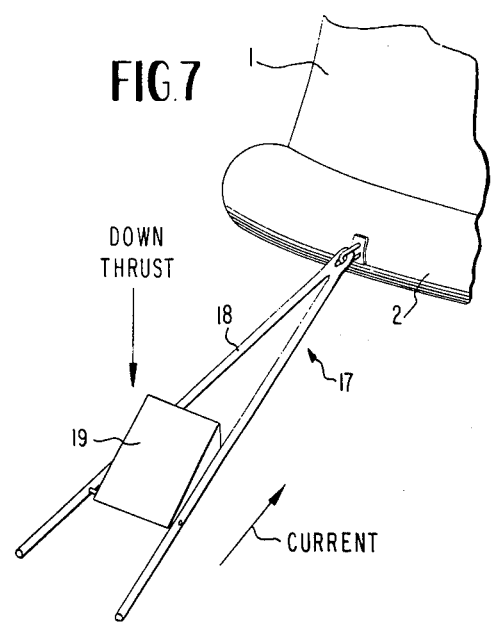
FIG. 7 is an enlarged perspective view of a holding device for maintaining the container on the water bottom surface.

An optional mechanism for holding the base member 2 against the water bottom utilizes a holding device 17 shown in enlarged form in FIG. 7. Holding device 17 comprises a bifurcated member 18 pivotally secured at one end 18a to the base member 2 with the other end resting upon the water bottom and a wedge-shaped pivoted member 19 pivotally mounted on the bifurcated member 18. The pivotal member 19 has oppositely disposed inclined planar faces 19a and triangular side walls 19b secured to the oppositely disposed inclined planar faces to form the wedge body. The pivotal member 19 is so disposed as to present one of its inclined faces 19a in such relationship to a water current that the pivotal member 19 is subjected to a downwardly directed thrust by the current which is thus communicated to the bifurcated member 18 and on to the base member 2. Such a relationship is indicated in FIG. 7 in which a down thrust arrow indicates a downward thrust by the current. The direction of the current is indicated in FIG. 7 by a current arrow pointing in the direction of the base member. The holding device 17 because of its pivotal construction is reversible for use in tidewaters or river waters.

FIG. 5 shows a tubular supporting member 20 with a clamplike reinforcing member 21 which, if reinforcement for flexible wall member 1 is desired, can be easily secured to wall member 1 to make the latter semi-rigid or rigid. By use of a gas or liquid under pressure within supporting members 20 the rigidity of flexible wall 1 to which members 20 are attached can be readily controlled.

In a typical operation the submersible container is positioned in relation to a selected bottom area to conduct a salvage case at sea with a known current. Initially, the salvage area is charted from the surface and the wreck to be salvaged is located by a standard means, for example, sonar, and is fixed as to position, depth, and other pertinent location factors. Underwater currents, tide-action, slope, and bottom are established and charted with the chart being utilized to determine the most efficient placement of the anchors 16.

Figure 8:
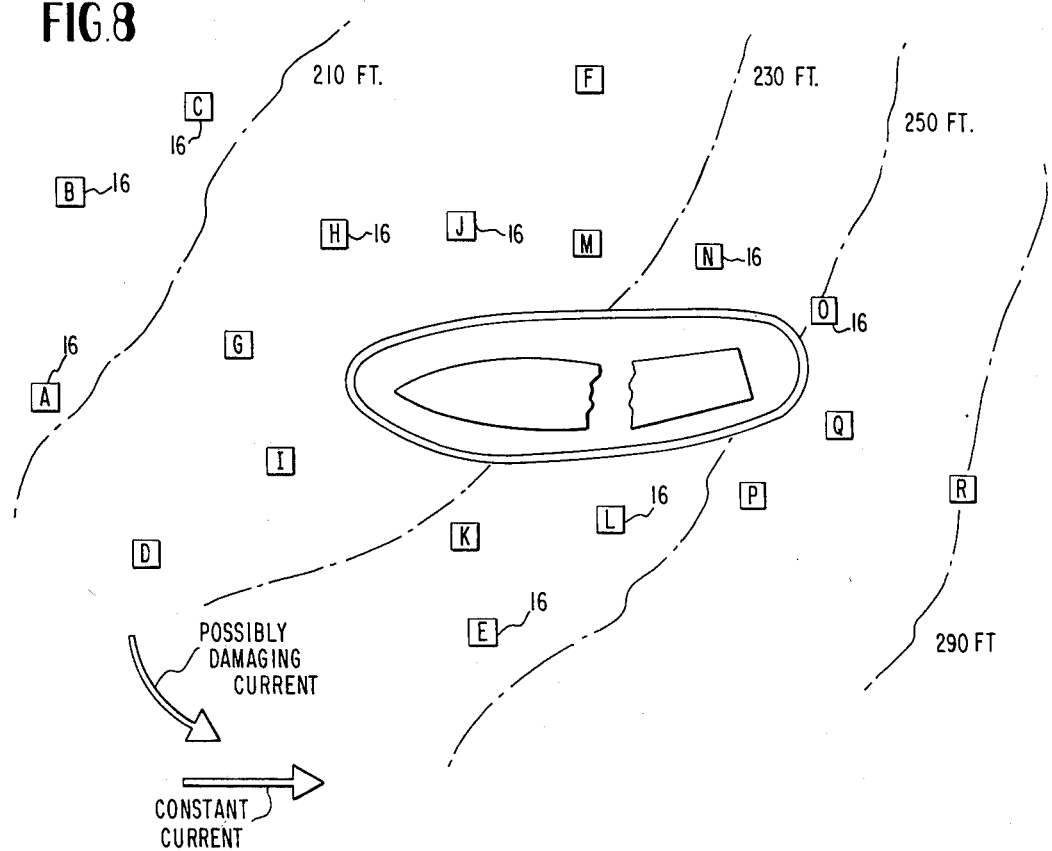
FIG. 8 shows a charted water bottom area indicating the most efficient placing of anchors.
Figure 9:
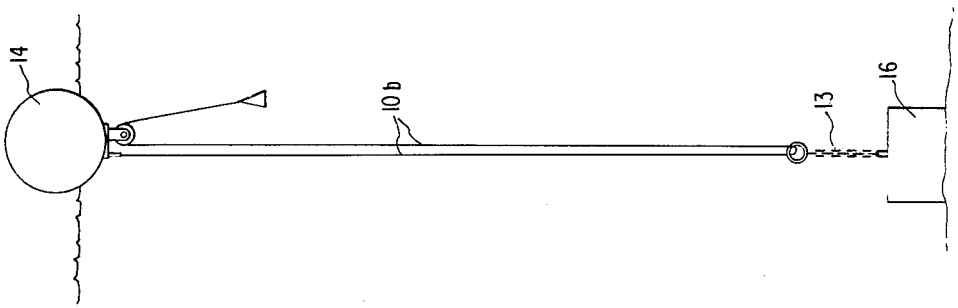
FIG. 9 discloses a securing line connection in side elevational view between a surface float and an anchor in a position preparatory to attachment to other securing lines of the container.
Figure 11:
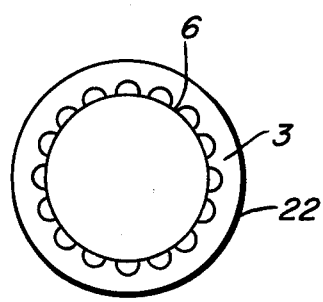
FIG 11 is an enlarged cross sectional view of yet another embodiment of the invention shown in FIG. 1 with dual walls.

Anchors 16 which are given identifying insignia, are placed in spots which have been predetermined and charted as shown by FIG. 8. The anchors 16 are positioned by running a line 10b through the guide ring on anchor chain 13, and threading the line through a pulley on a surface float 14. The surface float 14 is given an identifying insignia (not shown) corresponding to that of the anchor to which it is attached. FIG. 9 shows this arrangement, the insignia being omitted. Time must be allowed for setting of the anchor between the positioning time and the time for its use.

Figure 10:
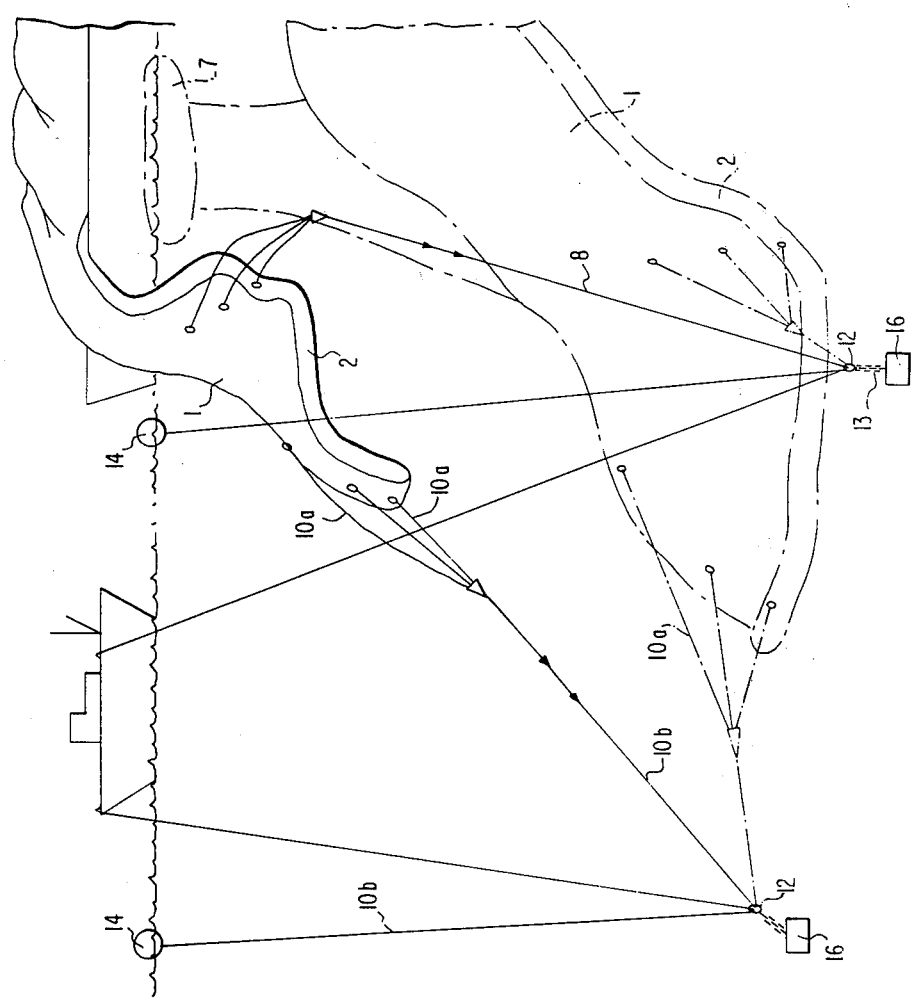
FIG. 10 shows a schematic view of a stage in the transfer of the container from a surface vessel to an assigned location shown in phantom on the charted water bottom area.

When the anchors 16 are firmly established in bedded positions, the sea container is positioned as is shown in FIGS. 8-10. First, the up-current securing lines 10a are attached, tightened and secured. The surface vessel carrying the sea container moves back with the current and the sea container, with rigging lines 9 and securing lines 10a attached thereto, is fed overside. As the sea container 1 arrives at the bottom, the lines 10b previously disconnected from the pulleys on the floats 14 are passed through the rings 12a on chains 13 and connected by means of connecting members 10c to the lines 10a, and the inflatable float tube 7, which initially was slightly inflated for a slight upward tension is now fully inflated.

The fill material 4, which may be contained in an accompanying surface vessel, is now sent down through the fill tubes 3 until the base member 2 is loaded. If detachable, fill tubes 3 can then be removed for use in connection with another sea container.

After the sea container is in place, high capacity water filters are sent down to the selected water area enclosed for the purpose of clarifying the volume of water enclosed by the sea container. If desired, pumps can circulate the enclosed water through a ship or shore plant for heat, oxygenation, medication, feed injection or any other necessary treatment.

As a further control measure, lines from an additional surface vessel or vessels may be fastened to the rings on the various anchor chains 13 as shown in FIG. 10.

An alternate embodiment of the invention is disclosed in FIG. 1 utilizing a second flexible wall 22. The second flexible wall 22 surrounds feed lines 3 and the inner flexible wall 6 so that dead water or other liquid or particulate can be pumped into the wall space between the two walls for insulating purposes. The second flexible wall can be secured to the base member 2 and the float 7 without contacting the feed lines 3 or can additionally be secured to the feed lines 3 to provide stability and reinforcement for the second wall 22. When a pump is used to circulate the fluid inside the principal compartment, any temperature can be maintained and the dual wall arrangement serves as insulation to the surrounding environment. A dual wall sea container can be used in various commercial applications, as for example, in containing coolant from nuclear power stations to prevent straight thermal release into a bay or other water way or to provide thermal control of the sea container. Additional uses for this embodiment are found in fish, algae, or sea food farms or simply to provide a warm habitat for divers working within the sea container.

It is also contemplated that the sea container of the instant invention serve as an underwater storage facility for storing gasoline, oil or the like. Under such circumstances, it would be preferable for the container to include a flexible bottom which is secured to the closed flexible wall member 1 to form a liquid tight storage chamber. In this embodiment, the chimney or narrowed section 1a could take the form of a hose or other piping to pump the gasoline, oil, etc. between the storage section 1b and the surface. Furthermore, when the sea container is used with an open bottom it can serve as a septic tank or the like in a lake, river, ocean or other body of water.

Figure 13:
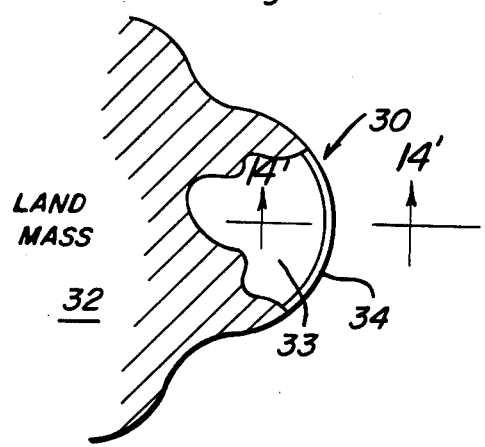
FIG. 13 is a plan view of still another embodiment of the invention used in combination with a land mass.

While the sea container has been shown by the previous figures to be constructed in a substantially tubular configuration to encircle an annular column of water, a linear sea wall 30 such as that shown in FIG. 13 is envisioned to utilize natural or man-made land masses or structures 32 in combination with the linear sea container. In this linear embodiment, the linear enclosed flexible wall 34 of the container is stretched across the mouth of a bay or inlet 33 as shown in FIG. 13 thus sealing a specific area for environmental control purposes or storage facilitates.

Figure 14:
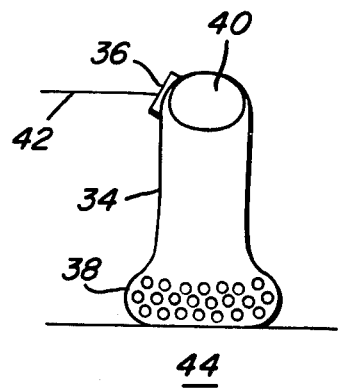
FIG. 14 is an enlarged cross sectional view taken along lines 14'—14' of FIG. 13 at low tide.
Figure 15:
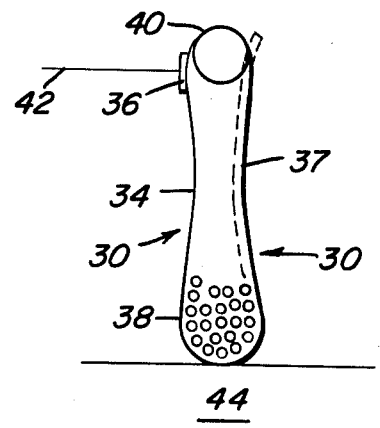
FIG. 15 is an enlarged cross sectional view taken along lines 14'—14' of FIG. 13 at high tide.

The linear sea wall 34 may be formed in the same manner as previously described or may have an elongated tube configuration in which the vertical axis in cross-section is longer than the horizontal axis. The sea wall is constructed of an endless flexible material which can flex when raised or lowered with high or low tides. The sea wall 34 can be anchored by fill 38 of any particular composition placed in the bottom of the sea wall through hatches 36 to anchor it to the bottom of the waterway. In another embodiment fill tubes 37, as shown in phantom in FIG. 15, can be incorporated with the linear sea wall. These tubes can be placed either inside the sea wall or outside the sea wall as has been previously disclosed. If desired, a separate base member such as the one previously described and disclosed by FIGS. 1-3 can be used although in the preferred embodiment linear tubular wall 34 does not have a separate base member. While water is generally used to fill the greater portion of the interior of wall 34, any suitable fluid can be used. A float member 40 or a plurality of float members are positioned in the top of the tube wall 34 and held in place by the wall so that a portion of the tube wall is always projecting above water level. The float member 40 can be inflatable as previously described or can be constructed of any naturally floating material. The flexing of the sea wall provides an effective sealing construction in that the float means 40 elongates the enclosed tube wall 34, as shown by comparing FIG. 14 to FIG. 15, to the extent needed to project the top of the wall above the water level 42 during high tide while allowing the tube wall 34 to assume a more squat composite configuration during low tide. Even though the water level changes, the bottom of the tube wall 34 still rests on the waterway bottom 44 while the top projects above water level. It should be noted that the linear sea wall embodiment can be anchored in the same manner as previously described in connection with the embodiment of FIGS. 1-3 so that no additional description of the anchoring is felt necessary.

It is my intention that the foregoing be considered as illustrative of the principles of my invention since numerous modifications and changes will readily occur to those skilled in the art. It is not contemplated that the invention be limited to the exact constructions and operations shown and described, but rather that all suitable modifications and equivalents may be restored to which fall within the scope of the invention as claimed.

What is claimed is:

1. A submersible container apparatus for isolating from adjacent water, a selected water bottom area together with an area extending upwardly from said selected bottom area to the water surface, comprising a flexible closed wall member bounding a selected water bottom area and extending to the water surface, a flexible tubular base member secured to the lowermost portion of said wall member, said tubular base member being adapted to receive flowable fill means for holding said base member under the influence of gravity against the water bottom bordering said selected water bottom area, and a plurality of fill tube means communicating at their lower ends with the interior of said tubular base member, secured along their length to said flexible closed wall member, and having upper ends positioned substantially at the top of said closed wall member, said upper ends of said fill tubes being adapted to receive said fill means for transmission through said fill tube means to said tubular base member.

2. Container apparatus according to claim 1 wherein said flexible tubular base member includes evacuation means for said fill means which comprises at least one aperture in said base member and selectively controlled closure means for opening each said aperture during evacuation of said tubular base member.

3. Container apparatus according to claim 1 including a float member secured to the top of wall member.

4. Container apparatus according to claim 3 wherein said float member is inflatable.

5. Container apparatus according to claim 1 including a second wall member connected to said first wall member and substantially surrounding said fill tubes and said first wall member.

6. Container apparatus according to claim 1 including anchoring means to position said flexible tubular base means in position bordering said selected water bottom prior to said base means receiving said fill means.

7. Submersible container apparatus isolating from the surrounding water a selected water bottom area together with a column of water extending upwardly from said bottom area to the surface comprising a flexible wall member closed upon itself bounding said selected water bottom area and extending up to the water surface, and defining the lateral and vertical limits of said column of water, said flexible wall member including a lower portion having a hollow base member secured thereto and an upper portion joined to said lower portion, said upper portion having a cross-sectional area less than that of said lower portion, and a balloon valve means disposed in the interior of said flexible wall member at the juncture of said lower portion and said upper portion whereby water in said lower portion is prevented from passing into said upper portion.

8. Container apparatus according to claim 7 wherein said balloon valve means comprises a hollow sphere of flexible material filled with fluid.

9. Container apparatus according to claim 7 including anchoring means connected to said flexible wall member for securing said submersible container in position relative to said selected water bottom area.

10. Container apparatus according to claim 9 wherein said anchoring means comprises a plurality of weight means lying in a selected pattern on the water bottom away from said wall member, and securing means extending from said weight means to said submersible container.

11. Container apparatus for isolating from the surrounding water a selected water bottom area together with a column of water extending upwardly from said bottom area to the surface, comprising endless flexible wall means bounding said selected water bottom area and said column of water, said endless wall means being closed upon itself and defining the lateral and vertical limits of said column of water, flexible tubular base means secured to an end of said wall means and containing fill means for holding said base member under the influence of gravity against the water bottom bounding said selected water bottom area, inflatable float means secured to the other end of said wall means, anchoring means connected to said wall means in position relative to said selected water bottom area, said anchoring means including a plurality of weight means lying in a selected pattern on the water bottom exteriorly of said selected water bottom area, and securing means extending from said weight means and connected to said endless wall means.

12. Container apparatus according to claim 11, wherein said securing means comprises rigging lines secured to and extending about the exterior of said wall means, and securing lines, connected to rigging lines, means operatively securing said securing lines to said rigging lines and means operatively securing said securing lines to said plurality of weight means.

13. Container apparatus according to claim 12, wherein said means operatively securing said securing lines to said rigging lines includes a selectively disconnectable connection from each of said securing lines to one of said rigging lines.

14. Container apparatus according to claim 12, including surface float members corresponding in number to said plurality of weight means, said means operatively securing said securing lines to said plurality of weight means comprising running connections on said plurality of weight means and connections of said securing lines to said float members.

15. Submersible container means in combination with a land mass for isolating, from a liquid environment a selected liquid bottom area, together with a volume of liquid extending upwardly from said selected liquid bottom area, comprising in combination submersible container means connected to said land mass, said submersible container means comprising a flexible enclosed fluid filled member forming a linear wall, each end of which is in contact with said land mass, the lowermost portion of said enclosed member in contact with said liquid bottom adjacent said selected liquid bottom area, fill means contained within said enclosed member to hold the bottom of said defined wall against the liquid bottom, anchor means engaging said member to hold said defined wall in a substantially fixed position, and at least one float member contained within said member to raise and lower the top of said defined wall in response to changes in the liquid level.

16. A submersible container apparatus for isolating from adjacent water, a selected water bottom area together with an area extending upwardly from said selected bottom area to the water surface, comprising a flexible closed wall member bounding a selected water bottom area, a hollow base member secured to the lowermost portion of said wall member, said hollow base member being adapted to contain fill means for holding said base member under the influence of gravity against a water bottom portion bordering said selected water bottom area, and a plurality of bifurcated members secured to said hollow base member, each of said bifurcated members pivotally supporting a holding member so positioned as to be responsive to the pressure of water currents for assisting in holding said base member against said water bottom portion.

* * * * *